Patented Sept. 26, 1939

2,174,475

UNITED STATES PATENT OFFICE 2,174,475

ENZYMATIC MANUFACTURE OF NUCLEOTIDES

Pawel Ostern, Lwow, Poland, assignor to Dr. Georg Henning, Chem. pharm. Werk G. m. b. H., Berlin-Tempelhof, Germany No Drawing. Application June 8, 1938, Serial No. 212,609. In Poland October 13, 1937

14 Claims. (Cl. 195—12)

The present invention relates to the enzymatic synthesis of nucleotides, and is particularly concerned with the preparation of compounds which contain, in the molecule, the adenine and ribose groups as well as a phosphoric acid radical attached to the end carbon atom of the ribose group.

A further object of the invention is the preparation of muscle adenylic acid or derivatives thereof, such as adenosine-polyphosphates and cozymase.

The present invention further provides a process for the preparation of muscle adenylic acid or derivatives thereof from adenosine or from substances capable of breaking down to form adenosine, or for converting nucleotides which do not contain phosphoric acid attached to the end carbon atom of the ribose group into muscle adenylic acid (adenosine - 5 - monophosphoric acid).

In the following description, the process of the invention is set forth solely by way of example, in connection with the preparation of muscle adenylic acid.

Adenosine - 5 - monophosphoric acid (muscle adenylic acid) is a constituent of animal cells, tissue fluids and bacteria. It appears here generally in the form of higher phosphoric acid compounds (adenosine-diphosphoric acid, adenosine-triphosphoric acid, cozymase). Heretofore adenylic acid has been prepared only by isolation from the aforenamed substances, in the free state or in the form of their phosphoric acid derivatives.

The molecule of muscle adenylic acid consists of the adenine and the ribose groups with a phosphoric acid radical attached to the end carbon atom of the ribose group. The structure is therefore as follows:

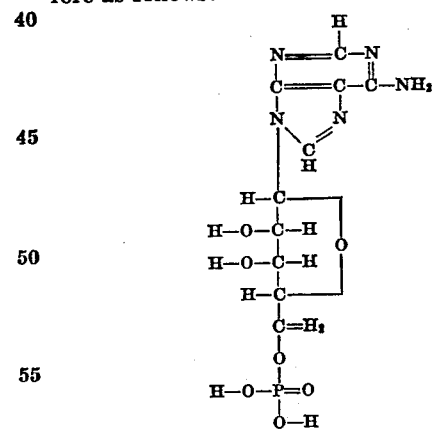

In accordance with the present invention, muscle adenylic acid can be produced synthetically from adenosine by introducing adenosine into a liquid, preferably aqueous, medium which contains compounds having the phosphoric acid radical, or by forming adenosine in such a medium, and then acting on the adenosine in this medium by means of enzymes at temperatures of less than about 50° C.

Suitable enzymes are those which have a phosphorylating or phosphate transferring action, i. e. enzymes which possess the capacity of binding inorganic phosphate or of transferring the phosphate radical from an organic ester, such as phosphoglyceric acid, to an organic substance. Enzymes of this character are contained in the various yeasts, as well as in bacteria such as lactic acid bacteria, and in fungi. Best results have been obtained by the use of fresh beer yeast, wine yeast and pressed yeast in well nourished condition, particularly after the yeast ferments were brought into solution by plasmolysis.

Accordingly, in the practical production of adenosine-5-monophosphoric acid, the liquid admixture containing adenosine and a substance containing the phosphate radical is brought into contact with substances or preparations which contain enzymes of the aforementioned character, particularly liquid yeast, dry yeast or yeast extract. The duration of the reaction depends primarily upon the type of enzyme preparation employed and upon the temperature. The reaction time necessary to effect a maximum binding of the phosphoric acid radical to the end carbon atom of the ribose group ranges generally between 30 and 360 minutes when the temperature is maintained in the vicinity of 35° C. The synthesis also takes place at room temperature or at lower temperatures, but this requires substantially longer reaction times. In general, practical operation is carried out in the temperature range between about 30 to 40° C., since the reaction is retarded by temperatures above 40° C., the rate of reaction dropping at about 50° C. to a magnitude which is of no practical value. The optimum moment for interrupting the reaction is preferably determined by the withdrawal of small test samples at short time intervals of, for example, about 15 minutes.

The reaction of yeast or yeast plasmolysate or yeast extract on adenosine in a phosphate solution produces adenosine-triphosphoric acid and cozymase in addition to muscle adenylic acid. In order to convert the higher phosphoric acid compounds of muscle adenylic acid into the monophosphoric acid compound, the higher compounds may be subjected to hydrolysis in a solution which is weakly alkaline to phenol-phthalein.

For optimum results, the reaction between the enzymes and the adenosine in the presence of a substance containing a phosphate radical should take place at a pH value between about 6 and 7.5. Use may be made in this regard of all water-soluble phosphate buffer solutions, although alkali metal phosphates or ammonium phosphate are preferred.

The yield of muscle adenylic acid and/or derivatives thereof, such as adenosine-polyphosphoric acids (adenosine-triphosphoric acid, adenosine-diphosphoric acid or di-adenosinetetraphosphoric acid, di-adenosinepentaphosphoric acid) and cozymase, may be increased by the addition of yeast-fermentable sugars, sugar-phosphoric acid esters or phosphoglyceric acid to the reaction mixture.

The adenosine, which is used as the initial material, may be obtained by the enzymatic or chemical hydrolysis of yeast nucleic acid in which the adenosine is present in the form of yeast adenylic acid (adenosine-3-monophosphoric acid). Instead of using adenosine as the initial material in preparing the muscle adenylic acid, advantageous use may also be made, as starting material, of substances which may be split up into adenosine, isolation of the latter being unnecessary since the enzymes present in the yeast or the like specifically and selectively phosphorylate the adenosine. Examples of substances which can be split up to yield adenosine are yeast nucleic acid and yeast adenylic acid. In the conversion of yeast adenylic acid into muscle adenylic acid by the action of the enzymes, the phosphate radical which is bound to the 3-position in the ribose group of the yeast adenylic acid is first split off, and the resultant adenosine is phosphorylated at the end carbon atom of the ribose group, i. e. in the 5-position.

When yeast nucleic acid is used as the starting material, hydrolysis must first be effected. Since the enzymatic splitting of the yeast nucleic acid takes place relatively slowly, it is desirable to first hydrolyze the yeast nucleic acid by chemical reaction, for instance with dilute acids, into nucleotide form. The resultant hydrolysate is then subjected, for example, to the action of plasmolyzed yeast at a pH of 4.5 to 6 for 24 to 72 hours, whereby the nucleotides yield the corresponding nucleosides by the splitting off of the phosphate radical. The mixture contains primarily adenosine as well as guanosine, cytidine, etc. After crystallizing out, if desired, of the guanosine, and adding phosphate solution or sugar phosphoric acid ester or phosphoglyceric acid, the mixture is subjected to the action of enzyme containing material, such as beer yeast.

Illustrative specific embodiments of the invention are set forth in the following examples.

*Example 1*

10 g. of adenosine are dissolved in a liter of a $\frac{1}{10}$ molar alkali metal phosphate buffer solution with a pH of 7. After the addition of 300 g. of fresh liquid beer yeast and 20 cc. of toluol, agitation is effected in a thermostat at 37° C. Every 15 minutes a small test sample is subjected to a phosphate determination. As soon as maximum addition of inorganic phosphate has taken place—which usually occurs after a reaction period of about 120 to 160 minutes—the reaction is interrupted by boiling or dealbuminization. The latter may be effected by adding to the reaction mixture an equal volume of 10% trichloracetic acid.

The resultant reaction mixture is filtered. The excess of inorganic phosphate is precipitated from the filtrate by means of barium hydroxide. The resultant precipitate is boiled several times with water. The muscle adenylic acid is recovered from the combined filtrates by adjusting the pH to a value of 6 by means of acetic acid and adding neutral lead acetate. The resultant lead precipitate is decomposed by means of hydrogensulfide and the solution concentrated in vacuo. The precipitation which takes place during the concentration is rendered complete by the addition of alcohol. The suction filtered crystals can be purified by dissolution in hot water, addition of alcohol, and standing for a long time in a refrigerator. The melting or decomposition point of the purified crystalline needles is 196°.

In order to include also in the manipulation the salts of the formed adenosine-polyphosphoric acids, precipitated by the barium hydroxide treatment, water may be added to the barium precipitate which is then heated on a boiling water bath, after the addition of barium hydroxide. This treatment effects hydrolysis so that there may also be recovered from the filtrate of the heated barium-containing precipitate, by means of excess neutral lead acetate solution following addition of acetic acid, the lead salt of muscle adenylic acid, which is then further treated as hereinbefore described.

*Example 2*

10 g. of adenosine and 20 g. of glucose or other fermentable sugar are dissolved in one liter of a ⅕ molar phosphate buffer solution having a pH of 7 and, after the addition of 300 g. of fresh beer yeast or a corresponding amount of dry yeast or yeast extract and 20 cc. of toluol, agitation is effected at 37° C. Every 15 minutes, a small test sample is subjected to a determination of the quantity of adenosine-polyphosphoric acids therein. When maximum synthesis has been attained, the reaction is interrupted as in Example 1, whereupon the co-ferments of the fermentation (adenosine-triphosphoric acid, adenosine-diphosphoric acid, cozymase) are isolated by known methods (see Biochemische Zeitschrift, vol. 281, 1935, pp. 157–159 and vol. 290, 1937, pp. 334–337).

*Example 3*

The synthesis is carried out as in Example 1, but with the difference that instead of fermentable sugars, there are added 20 g. of sodium phosphoglycerate or 20 g. of the sodium salt of one of the known sugar phosphoric acid esters (Neuberg-, Robison-, Cori-, Embden-, Harden- and Young-esters).

*Example 4*

The synthesis is carried out as in Example 1, but with the difference that instead of adenosine, use is made directly of yeast adenylic acid in an amount of 15 g. Upon prolonged fermentation, the yeast adenylic acid is split up, and the adenosine is then further converted into muscle adenylic acid.

*Example 5*

50 g. of yeast nucleic acid are hydrolyzed by chemical or enzymatic means (e. g. emulsion) into nucleoside form. The hydrolysate, from which the guanosine may have been removed, is neutralized to pH=7 and then subjected to enzymatic action according to Example 1. The muscle adenylic acid synthesis is not prejudiced by the presence of other nucleosides.

The foregoing examples are purely illustrative. It is evident that the procedure may be varied as to details without departing from the scope of the invention.

In the following claims, the term "compound which contains the adenine group and the ribose group with a phosphate radical at its end carbon atom" covers muscle adenylic acid as well as the higher phosphoric acid compounds thereof, such as adenosine-diphosphoric acid, adenosine-triphosphoric acid and cozymase. Where reference is made to adenosine in liquid medium, this is intended to cover adenosine as such introduced into liquid medium as well as adenosine produced in the medium itself and subjected to the action of enzymes according to the invention without the separation of the resultant byproducts.

What is claimed is:

1. In a process for the preparation of a nucleotide which contains the adenine group and the ribose group as well as a phosphate radical attached to the end carbon atom of the ribose group, the steps of bringing adenosine into a liquid medium which contains substances including a phosphate group in the molecule, introducing into the liquid medium an enzyme contained in yeast, and maintaining a temperature of less than about 50° C. in the reaction mixture.

2. In a process for the preparation of a nucleotide which contains the adenine group and the ribose group as well as a phosphate radical attached to the end carbon atom of the ribose group, the steps of adjusting a phosphate buffer solution to a pH value between 6 and 7.5, introducing adenosine into this solution, adding yeast to the resultant admixture, and maintaining a temperature of 10 to 50° C. in the reaction mixture.

3. In a process for the preparation of a nucleotide which contains the adenine group and the ribose group as well as a phosphate radical attached to the end carbon atom of the ribose group, the steps of preparing an aqueous adenosine-containing solution by the hydrolysis of a nucleoside, adjusting the resulting admixture to a pH between 6 and 7.5, adding to the solution a substance containing a phosphate group, adding yeast to the liquid admixture, and maintaining a temperature between 10 and 50° C. in the reaction mixture.

4. In a process according to claim 2, the further step of adding a yeast fermentable sugar, to the liquid mixture adjusted to a pH between 6 and 7.5.

5. In a process according to claim 2, the further step of adding a sugar phosphoric acid ester to the liquid mixture adjusted to a pH between 6 and 7.5

6. In a process according to claim 2, the further step of adding phosphoglyceric acid to the liquid mixture adjusted to a pH between 6 and 7.5.

7. In a process for the preparation of adenosine-5-monophosphoric acid, the steps of adjusting a phosphate buffer solution to a pH value between 6 and 7.5, introducing adenosine into the said solution, adding beer yeast to the solution, and agitating the resultant admixture at a temperature between 10 and 50° C.

8. In a process according to claim 7, the step of adding to the solution containing the phosphate and the adenosine a sugar which is fermentable by beer yeast.

9. In a process according to claim 7, the further step of adding sodium phosphoglycerate to the solution containing the phosphate and the adenosine.

10. In a process for the preparation of a nucleotide which contains the adenine group and the ribose group as well as a phosphate radical attached to the end carbon atom of the ribose group, the steps of bringing adenosine into a liquid medium which contains substances including a phosphate group in the molecule, introducing into the liquid medium an enzyme contained in yeast, maintaining a temperature of less than about 50° C. in the reaction mixture, for at least one hour, intermittently agitating the reaction mixture, interrupting the reaction by dealbuminization, filtering the resultant admixture, and precipitating the muscle adenylic acid from the filtrate in the form of a lead salt.

11. In a process according to claim 2, the further steps of interrupting the action of the yeast enzymes on the adenosine, precipitating the reaction mixture with a barium salt, hydrolyzing the salts of adenosine-polyphosphoric acids present in the barium-containing precipitate, filtering the hydrolyzed admixture, and precipitating a lead salt of muscle adenylic acid from the filtrate.

12. In a process for the preparation of muscle adenylic acid, the steps of adjusting a phosphate buffer solution to a pH value of 6 to 7.5, introducing yeast adenylic acid into the said solution, adding yeast to the resultant admixture, and maintaining a temperature between 10 and 50° C. for several hours in the reaction admixture containing the yeast.

13. In a process according to claim 2, the further step of plasmolyzing the yeast prior to the addition thereof to the adenosine-containing admixture.

14. In a process for the preparation of a nucleotide which contains the adenine group and the ribose group as well as a phosphate radical attached to the end carbon atom of the ribose group, the step of subjecting adenosine to the action of an enzyme contained in yeast in the presence of a substance containing a phosphate group.

PAWEL OSTERN.